United States Patent [19]

Brünle et al.

[11] Patent Number: 4,983,961
[45] Date of Patent: Jan. 8, 1991

[54] THREE STAGE NON-BLOCKING SWITCHING ARRAY

[75] Inventors: Siegfried Brünle, Backnang; Klaus Eberspächer, Weissach, both of Fed. Rep. of Germany

[73] Assignee: ANT Nachrichtentechnik GmbH

[21] Appl. No.: 302,465

[22] Filed: Jan. 27, 1989

[30] Foreign Application Priority Data

Jan. 29, 1988 [DE] Fed. Rep. of Germany ....... 3802579

[51] Int. Cl.$^5$ .......................... H04Q 1/00; H04B 3/38
[52] U.S. Cl. ................................. 340/825.8; 340/826; 379/220; 379/271
[58] Field of Search ........... 340/825.79, 825.8, 825.01, 340/826, 827; 379/220, 221, 271–274, 306, 335; 371/8.1; 370/16

[56] References Cited

U.S. PATENT DOCUMENTS

| | | | |
|---|---|---|---|
| 3,582,560 | 6/1971 | Banks et al. | 379/271 X |
| 3,978,291 | 8/1976 | Bergeron, Jr. et al. | |
| 4,455,645 | 6/1984 | Mijioka et al. | 340/825.01 X |
| 4,536,870 | 8/1985 | Boro et al. | 370/16 |
| 4,605,928 | 8/1986 | Georgious | 379/273 X |
| 4,630,046 | 12/1986 | Rein | |
| 4,654,842 | 3/1987 | Coraluppi et al. | 370/16 |
| 4,807,280 | 2/1989 | Posner et al. | 379/272 |
| 4,811,333 | 3/1989 | Rees | 340/825.8 X |
| 4,862,161 | 8/1989 | Schomers | 340/825.8 |

FOREIGN PATENT DOCUMENTS 0240580 4/1986 European Pat. Off. .
1130482 4/1964 Fed. Rep. of Germany .
2424727 12/1975 Fed. Rep. of Germany .

OTHER PUBLICATIONS

Yoshihisa Sakurai, "Multistage Link Connection Network", Patent Abstracts of Japan, vol. 11, No. 122, Apr. 1987.
V. P. Kumar et al., "Augmented Shuffle-Exchange Multistage Interconnection Networks", Computer, vol. 20, No. 6, Jun. 1987.
Charles Clos, "A Study of Non-Blocking Switching Networks", Bell System Technical Journal, vol. XXXII, 1953, pp. 406–425.

Primary Examiner—Ulysses Weldon
Attorney, Agent, or Firm—Spencer & Frank

[57] ABSTRACT

A three-stage non-blocking switching array having twice the number of inputs and outputs for its sub-arrays of its input and output stages as the number of lines to be switched, and having one more sub-array in its intermediate stage than the minumum required to form a non-blocking switching array. The additional or redundant inputs and outputs are connected with the non-redundant inputs and outputs such that the redundant inputs are each individually connected with a non-redundant input of a respective other sub-array of the same respective stage. This construction maintains the non-blocking characteristic of the switching array even if one of the sub-arrays fails since, in such use, redundant substitute paths are available.

12 Claims, 6 Drawing Sheets

THREE STAGE NON-BLOCKING SWITCHING ARRAY

CROSS REFERENCE TO RELATED APPLICATION

This application claims the priority of German application Ser. No. P 38 02 579.5 filed Jan. 29, 1988, which is incorporated herein by reference.

BACKGROUND OF THE INVENTION

The present invention relates to a three stage non-blocking switching array for a plurality of input lines, which is of the type including an input stage having a plurality of sub-arrays with inputs and outputs, an intermediate stage having a plurality of sub-arrays with inputs and outputs, and an output stage having a plurality of sub-arrays with inputs and outputs, with the input lines being distributed to the inputs of the input stage. Such switching arrays are known from an article by Charles Clos, "A Study of Non-Blocking Switching Networks", Bell System Technical Journal, Vol. XXXII, 1953, pages 406–425, and U.S. Pat. No. 3,978,291, incorporated herein by reference.

Switching arrays of the type disclosed in the above publications are constructed in three stages, with each stage being comprised of a plurality of sub-arrays. Assuming the switching array as a whole has N input lines and N output lines to be selectively interconnected, by meeting certain conditions, it is possible in a three-stage structured array to keep the number of crosspoints or interconnections lower than $N^2$ while still providing an array exhibiting non-blocking characteristics.

It is possible, in principle, to construct a switching array having non-blocking characteristics by modification of a switching array which is otherwise not blockage free through expansion, for example by doubling the number of crosspoints. However, this involves a considerable amount of additional expenditure.

SUMMARY OF THE INVENTION

It is an object of the present invention to configure a switching array of the type initially mentioned above, in such a manner that its non-blocking characteristic is ensured even if any one of the sub-arrays is malfunctioning.

This object is accomplished by a three stage non-blocking switching array for a plurality of input lines, which is of the type including an input stage having a plurality of sub-arrays each having plurality of inputs and outputs, and with the input lines being distributed to the inputs of the sub-arrays of the input stage, an output stage having a plurality of sub-arrays each having a plurality of inputs and outputs, and an intermediate stage having a plurality of sub-arrays, each having a plurality of inputs and outputs, for establishing connections between the outputs of the input stage and the inputs of the output stage; wherein: the number of the inputs and outputs of the input stage and of the output stage is at least twice the number of the input lines, whereby the sub-arrays of the input stage each have at least one primary input connected to an input line and at least one redundant input, and the subarrays of the output stage each have at least one primary output and at least one redundant output; the intermediate stage has at least one sub-array more than is required for a non-blocking switching array; each primary input of each the input stage sub-array is connected to a respective redundant input of a respective different one of the other of the sub-arrays of the input stage; and, each primary output of each the output stage sub-array is connected to a respective redundant output of a respective different one of the other of the sub-arrays of the output stage.

A switching array constructed in accordance with the teachings of the present invention as herein described will provide the following as well as further advantages.

If a sub-array of any stage of a switching array a according to the present invention malfunctions, the signals normally carried through the malfunctioning array are switched through the total array via the redundant inputs and outputs of other sub-arrays so that no connections are lost and the non-blocking characteristic is ensured at all times. If symmetrical modules are employed for the sub-arrays, nonblocking redundant paths can be switched by way of a Clos type array. For repairs or in the case of malfunctions, one sub-array per stage can be exchanged without blockage of the switching array.

If necessary, the switching array according to the present invention can be expanded without interference even during operation. If a plurality of sub-arrays are accommodated jointly on one circuit board in the input or output stage and if certain wiring conditions for the subarrays are met, the failure of an entire circuit board can be accepted without loss of the non-blocking characteristics of the entire switching array.

A more complete understanding of the invention and many of the attendant advantages thereof will be readily perceived by reference to the following detailed description when considered in connection with the accompanying figures.

Other objects, advantages and features of the present invention will become apparent to those skilled in the art from the following discussion.

DETAILED DESCRIPTION OF EXEMPLARY EMBODIMENTS

Figure 1:
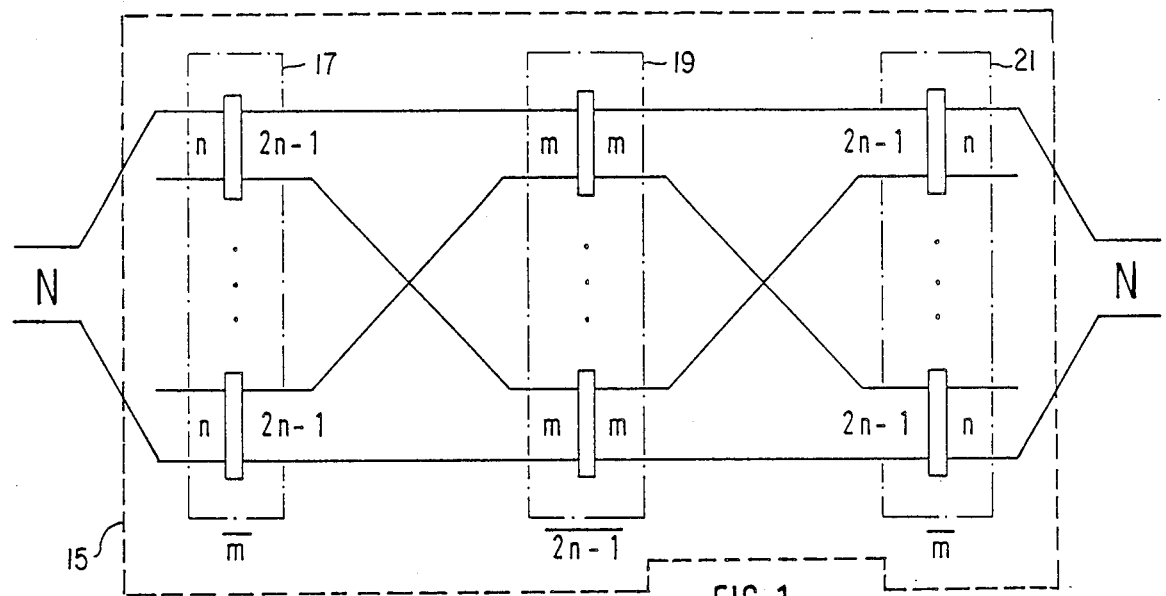
FIG. 1 is a schematic block circuit diagram illustrating a prior art Clos type switching array.

For better understanding of the present invention, reference is first made to FIG. 1 which illustrates the structure of a prior art Clos type switching array. The switching array 15 has N inputs, and is composed of three stages. Input stage 17 is comprised of m sub-arrays, each having n inputs and 2n−1 outputs, so N equals m×n. Intermediate stage 19 is composed of 2n−1 sub-arrays, each having m inputs and m outputs. Output stage 21 is composed of m sub-arrays, each having 2n−1 inputs and n outputs. The Clos structure according to FIG. 1 is non-blocking. Non-blocking means that a connection can be established between any desired input and any desired output.

The Clos switching array 15 according to FIG. 1 has a drawback in that, if the sub-arrays employed have square matrixes, ie. an equal number of inputs and outputs, the basic modules in the input and output stages are not utilized optimally, since only n inputs are used while 2n−1 outputs are required, thereby leaving at least 2n−1−n unused inputs. With the aid of these inputs which are not needed in the Clos type switching array, it is possible to construct redundant Clos type switching arrays. Redundance here means that two different connection paths are available to connect one input with one output of the switching array.

Figure 2:
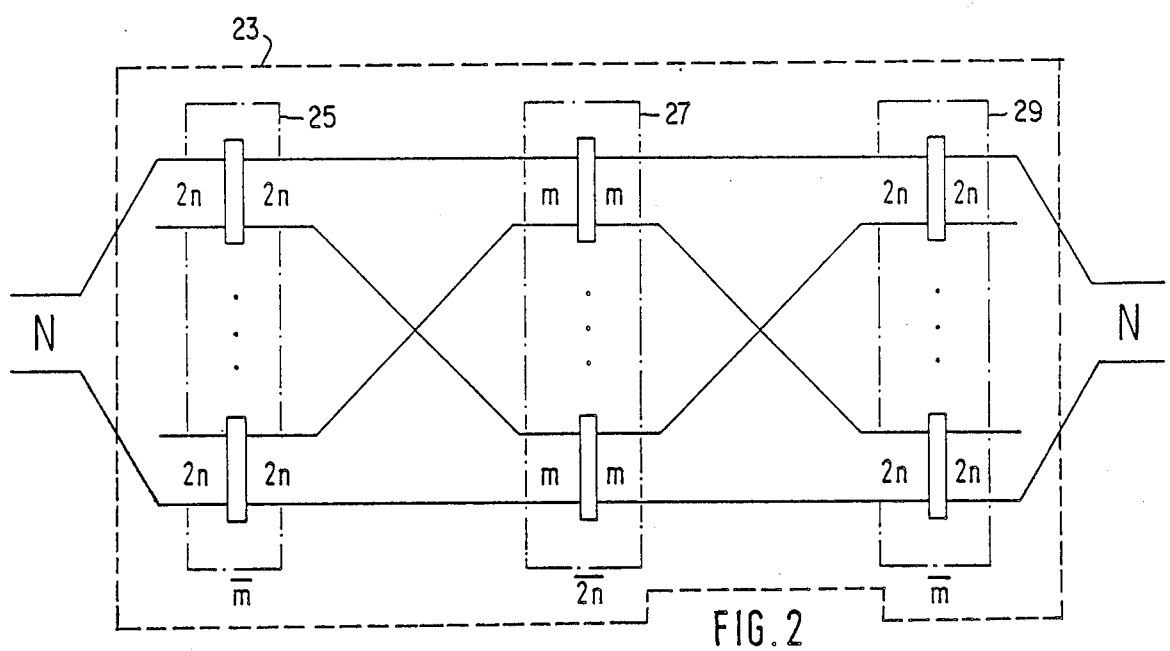
FIG. 2 is a basic schematic block circuit diagram of a redundant Clos type switching array according to the present invention.

FIG. 2 illustrates a modified Clos type switching array 23 equipped with square sub-arrays. It is redundant, i.e. any desired sub-array can malfunction without loss of the non-blocking characteristics of the array. The switching array 23 according to FIG. 2 has m sub-arrays in input stage 25 and m sub-arrays in output stage 29, with each sub-array of these stages having 2n inputs and 2n outputs. The intermediate stage 27 has 2n sub-arrays each having m inputs and m outputs, i.e. one sub-array more than in the conventional Clos type structure. Compared to the switching array 15 of FIG. 1, the sub-arrays of the input stage 25 and output stage 29 according to the invention have twice the number of inputs and outputs respectively. Thus any sub-array of the input stage and of the output stage will have 2n lines with n primary lines and n redundant lines. So N equals m×n according to FIG. 2.

Figure 3:
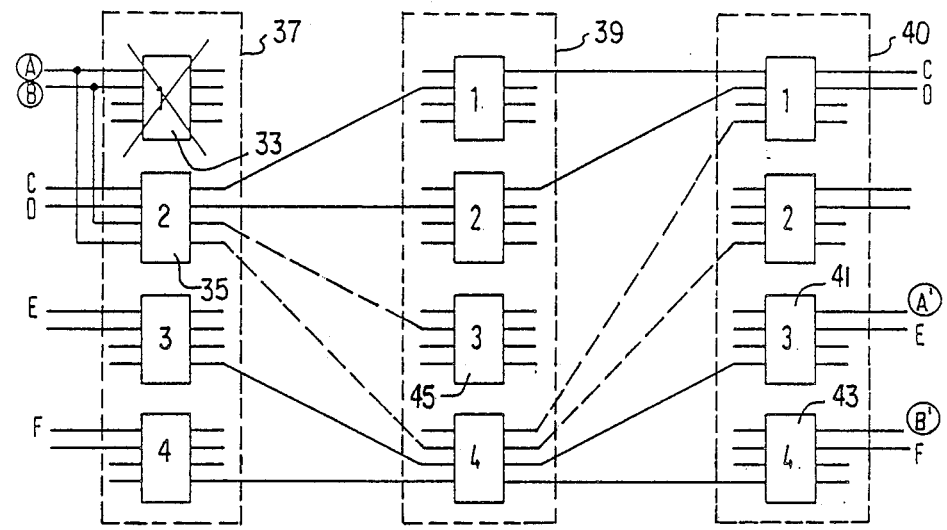
FIG. 3 is a schematic circuit diagram of a redundant three stage switching array illustrating a non-desirable blockage if redundant lines of one sub-array are jointly connected to a single further sub-array.

In order to maintain the non-blocking characteristic even when a sub-array of the input stage 25 or the output stage 29 is malfunctioning, the n redundant lines of each sub-array of the input and output stages must, according to the invention, be individually distributed to other sub-arrays of the same stage. FIG. 3, wherein n=2, m=4 and N=8, illustrates that the n redundant lines of any single sub-array, sub-array in the illustrated example, must not all be brought to one further sub-array, sub-array 33 in the illustrated example, of the input stage 25.

In FIG. 3, it is desired to establish connection between primary input lines A and B leading into sub-array 33 and primary output lines A' and B' leading from sub-arrays 41 and 43 respectively of output stage 40. Lines A and B, leading to the first sub-array 33 of the input stage 37 are both connected to the respective redundant inputs of only one other sub-array, i.e. the second sub-array 35. If the first sub-array 33 of the input stage 37 should malfunction, connection paths A—A' and B—B' can no longer be established since in order for A and B to arrive at their desired destinations A' and B' both would have to be switched through the third sub-array 45 of the intermediate stage 39 because all other paths from sub-array 35 to sub-arrays 41 and 43 are busy as illustrated by solid lines. However, only a single line connects sub-array 35 with sub-array 45, and therefore A and B cannot both be switched through sub-array 45 from sub-array 35. So a blocking condition is established.

Figure 5:
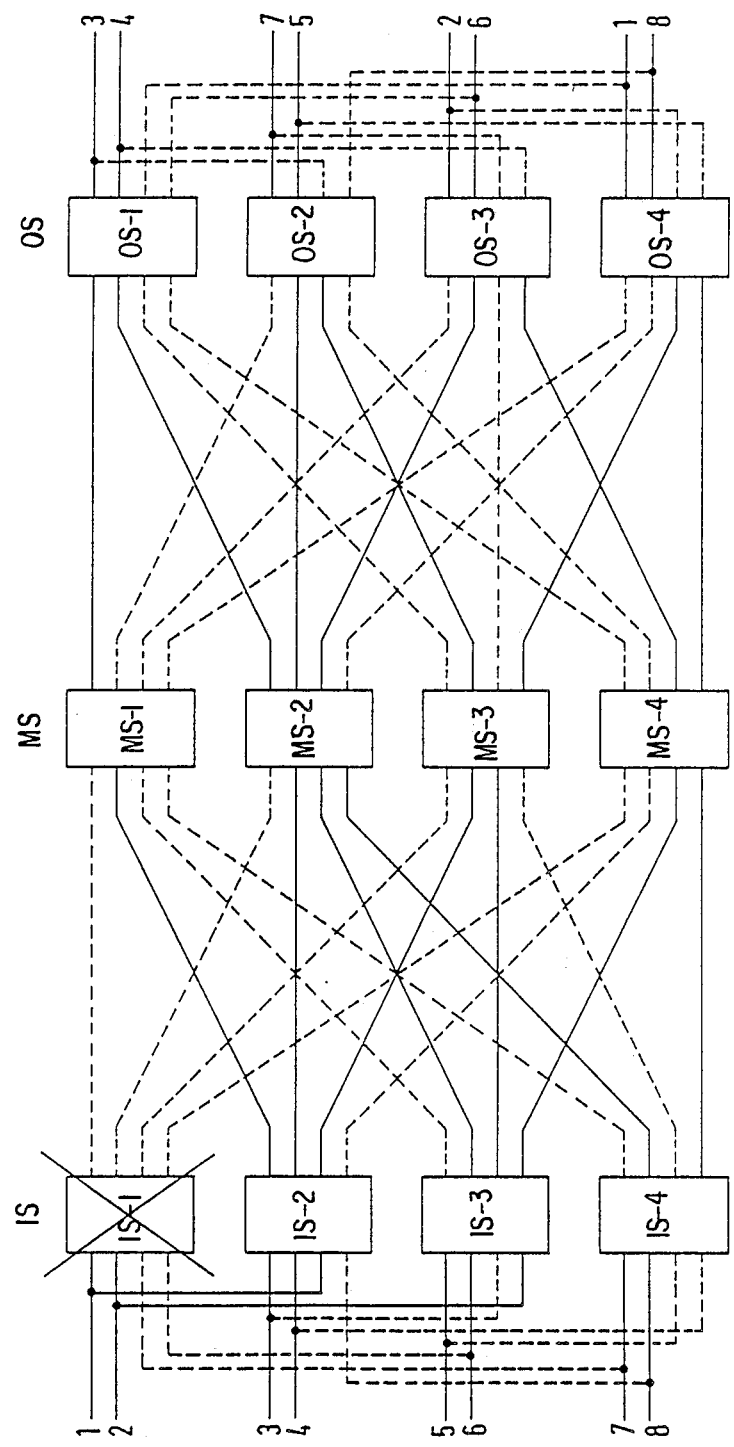
FIG. 5 is a schematic circuit diagram illustrating a switching array according to the present invention for 8 input and 8 output lines.

If, in the alternative, the n redundant inputs and outputs of the input and output stages, respectively, are connected with non-redundant inputs and outputs of n other sub-arrays of the same stage, i.e. the redundant paths are distributed individually to a plurality of sub-arrays, as illustrated, for example, in FIG. 5, the non-blocking characteristic is always ensured if one sub-array of the input stage or output stage malfunctions. Since, in the switching array according to the present invention, one more sub-array is provided in the intermediate stage than would be required for a non-blocking Clos type switching array, the non-blocking characteristic is ensured even if a sub-array of the intermediate stage malfunctions.

Figure 4:
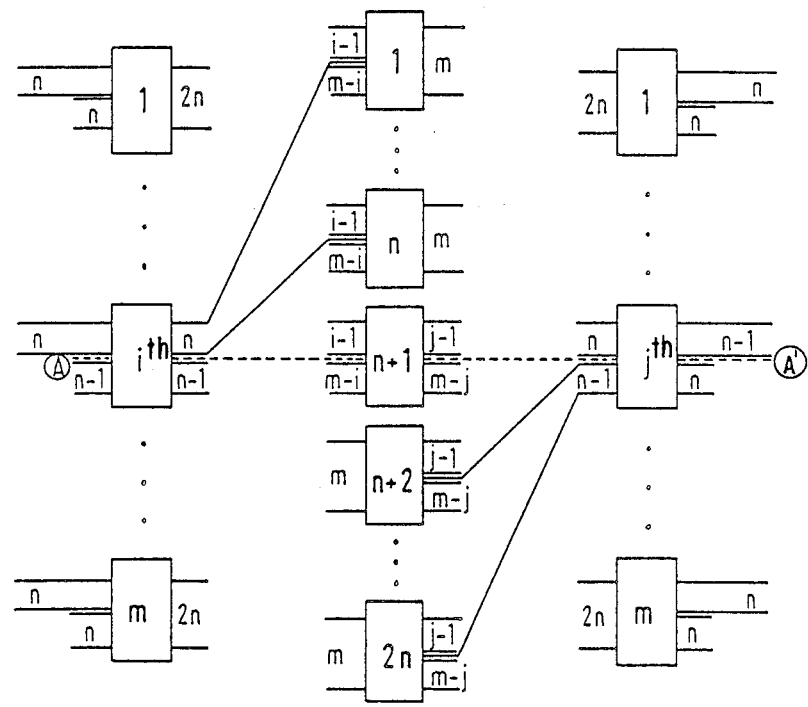
FIG. 4 is a schematic partial circuit diagram illustrating the non-blocking construction of the present invention.

The non-blocking characteristic of the switching array according to the present invention will be described with reference to FIG. 4, which illustrates, as the "worst case", the malfunction of a sub-array in the input stage. By dividing the redundant paths as described above and illustrated in FIG. 5, at most one redundant line is brought across each sub-array in the input and output stages.

If a sub-array in the input stage malfunctions before a switch can be made to a substitute connection, in the worst case, n+(n−1) sub-arrays of the intermediate stage are currently utilized by the n lines of the $i^{th}$ sub-array of the input stage and by the n−1 lines of the $j^{th}$ sub-array of the output stage. However, since the intermediate stage has 2n sub-arrays, one sub-array of the intermediate stage is still always available through which a redundant line can be switched to the desired output. In FIG. 4 it is the (n+1)th sub-array of the intermediate stage over which the substitute connection A—A' can be made from the $i^{th}$ sub-array of the input stage to the $j^{th}$ sub-array of the output stage. If an entire sub-array of the output stage malfunctions, there is also always an available alternative path for reasons of symmetry.

A comparison of FIGS. 1 and 2 demonstrates that the malfunction of a sub-array in the intermediate stage is taken care of, according to the invention, by the additional subarray in the intermediate stage. Thus, it is possible with measures according to the present invention to construct a Clos type switching array to be redundant so that any desired sub-array can malfunction without the array losing its nonblocking characteristic.

Figure 6:
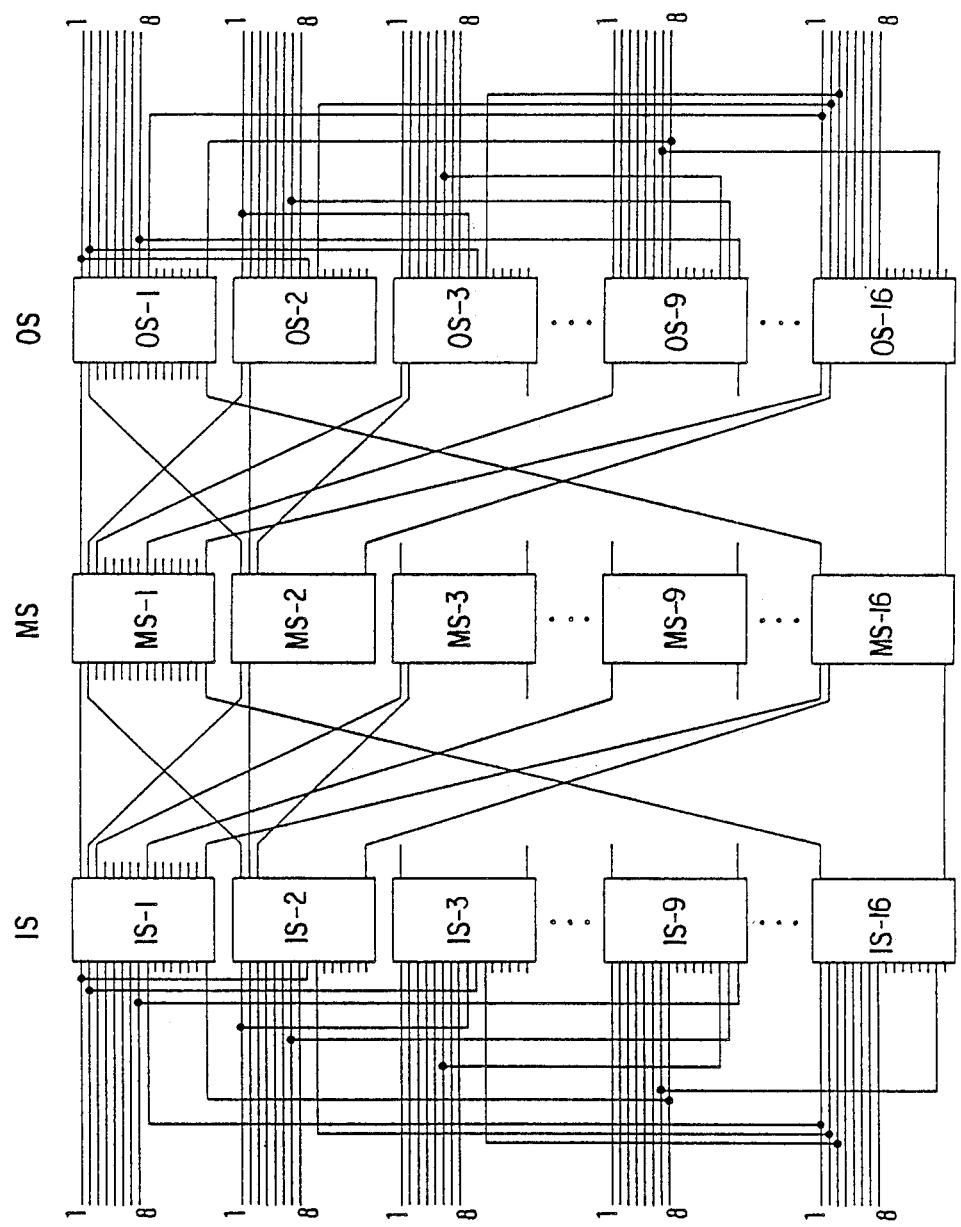
FIG. 6 is a schematic circuit diagram illustrating a switching array according to the present invention having 128 input and 128 output lines.

FIGS. 5 and 6 illustrate embodiments of Clos type switching arrays with sub-arrays with redundancy according to the present invention. In FIG. 5 the switching array has 8 inputs and 8 outputs (N=8, M=4 and n=2) and in FIG. 6 the switching array has 128 inputs and 128 outputs (N=128, M=16 and n=8.

FIG. 5 illustrates the substitute paths if the first sub-array IS-1 of the input stage IS is malfunctioning. The occupied paths are illustrated as solid lines in FIG. 5 and the unused or redundant paths as dashed lines. The redundant lines at the inputs of the input stage IS and at the outputs of the output stage OS are cyclically linked in each case. Cyclic linking means that in FIG. 5 the redundant lines for connection of the first sub-array IS-1 or OS-1 are distributed to the second and third sub-arrays IS-2, OS-2 and IS-3, OS-3, respectively, and the redundant lines for the connections of the second sub-array IS-2 or OS-2 are distributed to the third and fourth sub-arrays IS-3, OS-3 and IS-4, OS-4, respectively. The redundant lines for the connections of the third sub-array IS-3 or OS-3 are distributed to the fourth and the first sub-arrays IS-4, OS-4 and IS-1, OS-1 respectively, while the redundant lines of the fourth sub-array IS-4 or OS-4 are distributed to the first and second sub-arrays IS-1, OS-1 and IS-2, OS-2, respectively. The same applies correspondingly for the redundant lines of FIG. 6.

This cyclic linkage to the redundant lines results in a clear wiring scheme and thus fewer switching errors. However, it is understood that a cyclic linkage is not required, but only that each sub-array have only one redundant line connected to a respective other sub-array of the respective stage. Moreover, the cyclic linkage provides additional advantages, particularly if a plurality of subarrays of the input or output stage are combined into a group and their redundant inputs and outputs are likewise cyclically linked with other groups of sub-arrays, such as illustrated in FIG. 7.

Figure 7:
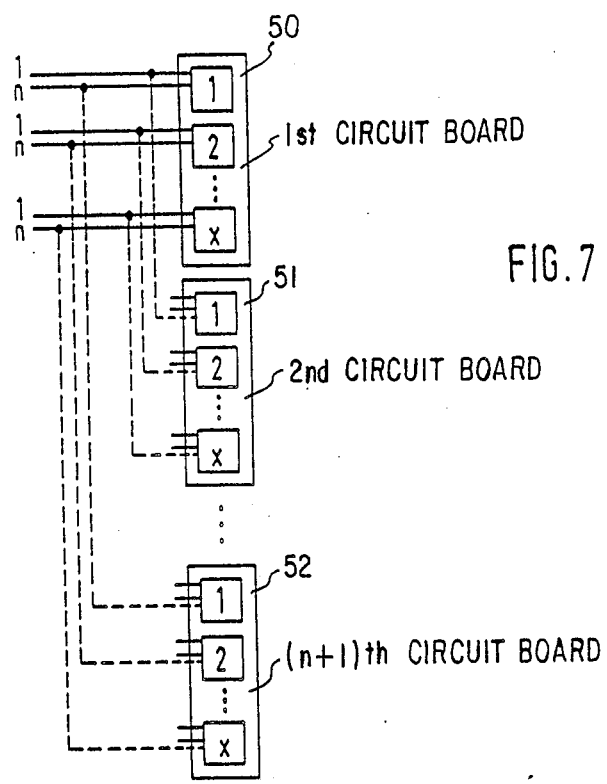
FIG. 7 is a schematic diagram illustrating the cyclic connection of the input lines of a plurality of sub-arrays mounted in groups on circuit boards.

In the embodiment of FIG. 7, groups of x sub-arrays each are accommodated on individual circuit boards 50, 51 and 52. If there are n primary inputs for each sub-array in each group, then there must be n+1 groups and n+1 circuit boards. The cyclic linkage is realized here in such a manner that the dashed lines representing redundant connections to the primary input connections of the first circuit board 50 are distributed to the second board 51 through the (n+1)$^{th}$ circuit board 52, those of the second circuit board 51 are distributed to the third through the (n+2)$^{th}$ circuit boards (not specifically illustrated) etc. In the illustrated embodiment, with a total of n+1 circuit boards, the first circuit board 50 assumes the cyclic position of the n+2$^{th}$ board, therefore the redundant lines of the second circuit board 51 are distributed to the third board and around through to the first circuit board 50. The redundant lines of the last circuit board are then brought back to the first to the n$^{th}$ circuit boards, thus, not only will non-blockage be maintained if one sub-array fails in the input stage and in the output stage, but a group of x sub-arrays disposed on one circuit board may also fail without loss of the nonblocking characteristics of the switch array.

This cyclic linkage, which requires at least n+1 circuit boards for n connections per sub-array, is also of significance for modular expansion of the switching array. In the intermediate stage, however, due to the redundance, no more than one sub-array can be accommodated on a circuit board, since here, in contrast to the conventional Clos type switching array, only one sub-array above the required Clos type minimum can be connected and thus exchanged.

It is of advantage to employ identical square modules for the input and output stages.

The switching array according to the present invention is comprised, for example, of array components having a size of 16×16. These may already form a sub-array or a sub-array may be comprised of such array module components.

In order to keep the number of crosspoints and switching modules low and the complexity of the network manageable, the modified Clos type switching array for 512 connections is configured of 16×16 modules in both the input stage and the output stage. Thus a redundant Clos type switching array according to the invention has 64(16×16) sub-arrays in both the input stage and the output stage and has 16(64×64) sub-arrays in the intermediate stage.

Figure 8:
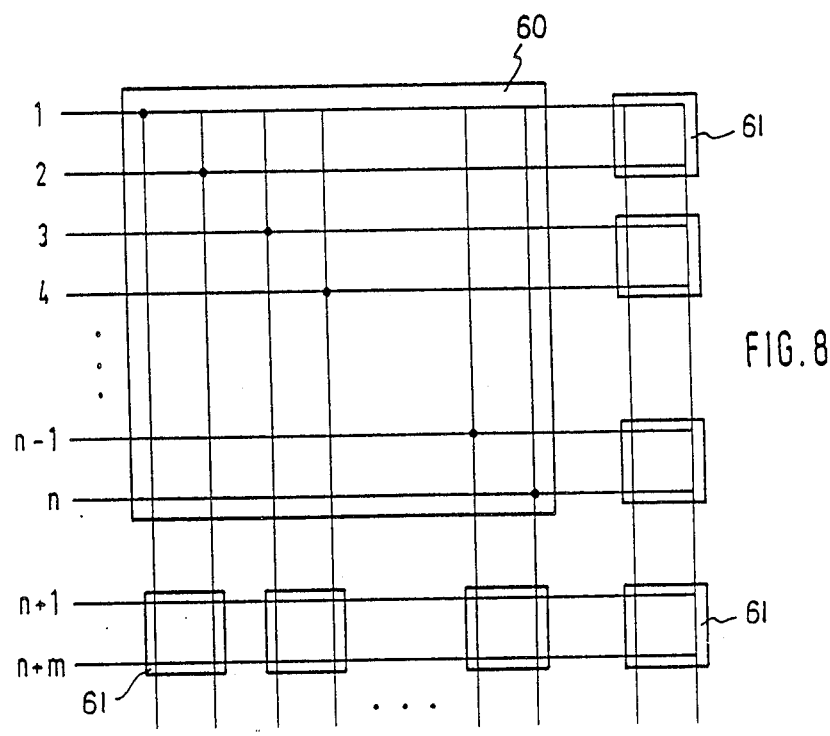
FIG. 8 illustrates the modular expansion of a switching array according to the invention.

According to FIG. 8, a redundant Clos switching array 60 of n×n dimension can be expanded in modular fashion by means of single-stage switching arrays 61 of m×m dimension. However, redundance remains in effect only if the single-stage switching arrays 61 have redundant inputs.

Figure 9:
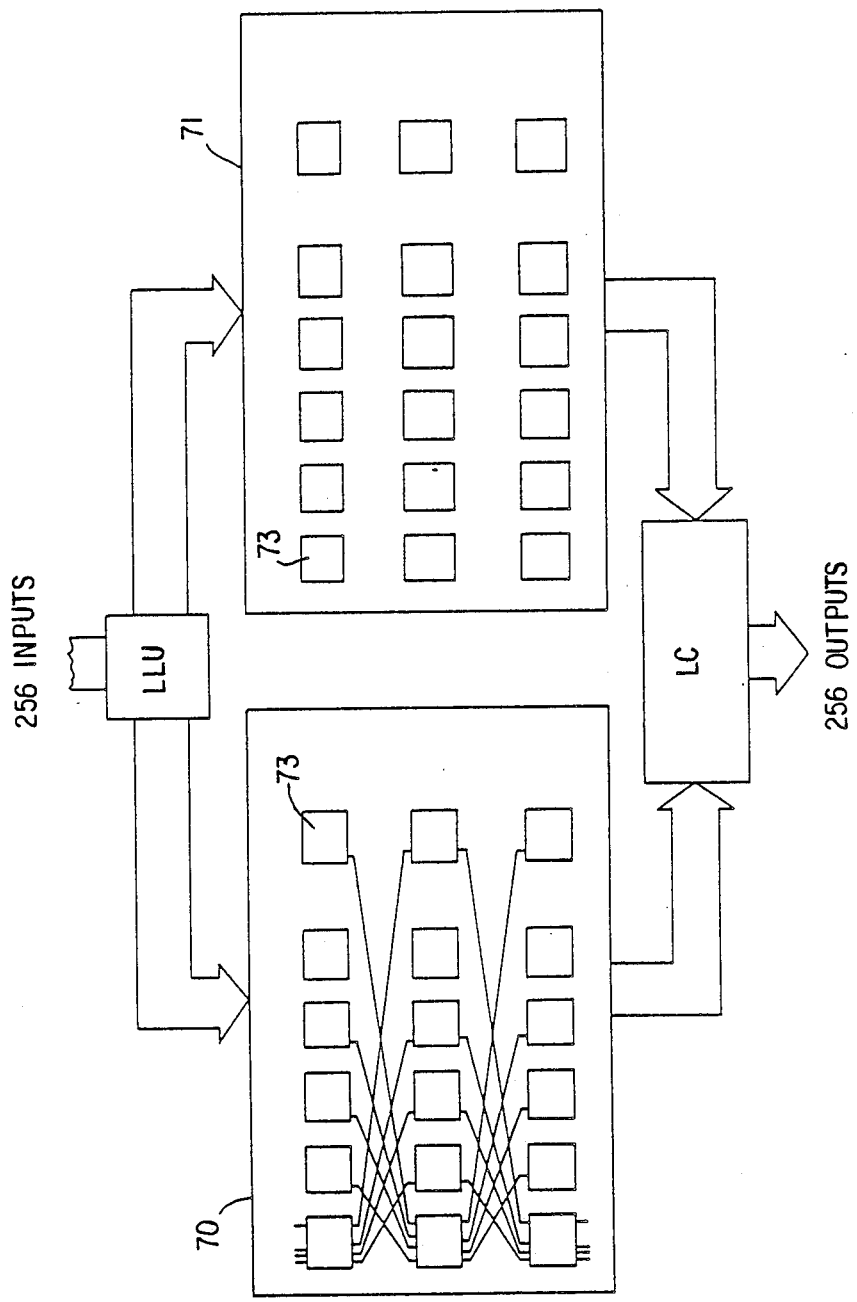
FIG. 9 illustrates the parallel connection of switching arrays according to the invention.

An alternative method for expansion is to connect redundant arrays 70 and 71 in parallel as illustrated in FIG. 9. The array illustrated in FIG. 9 is obtained by connecting in parallel two switching arrays 70 and 71 comprised of square modules 73. Through the intermediary of a linkage logic unit LLU, if necessary, the inputs are uniformly distributed to both switching arrays 70 and 71 and the outputs are combined by way of a linkage circuit LC.

The non-blocking characteristic with redundance will remain in effect as long as the linkage logic unit LLU and the linkage circuit LC do not fail.

Many varied applications for a switching unit according to the teachings of the present invention ar possible. The construction of the crosspoint circuits for the sub-array can be employed, for example, in a configuration as an emitter stage or as a differential amplifier stage with a base stage connected to its output as disclosed in European Pat. No. 148,395, corresponding to U.S. Pat. No. 4,630,046.

The invention now being fully described, it will be apparent to one of ordinary skill in the art that many changes and modifications can be made thereto without departing from the spirit or scope of the invention as set forth herein.

What is claimed is:

1. In a three stage non-blocking switching array for a plurality of input lines, and including an input stage having a plurality of sub-arrays each having a plurality of inputs and outputs, and with the input lines being distributed to said inputs of said sub-arrays of said input stage, an output stage having a plurality of sub-arrays each having a plurality of inputs and outputs, and an intermediate stage having a plurality of sub-arrays, each having a plurality of inputs and outputs, for establishing connections between said outputs of said input stage and said inputs of said output stage; the improvement wherein:

the number of said inputs and outputs of said input stage and of said output stage is at least twice the number of said input lines, whereby said sub-arrays of said input stage each have at least one primary input connected to an input line and at least one redundant input, and said sub-arrays of said output stage each have at least one primary output and at least one redundant output;

said intermediate stage has at least one sub-array more than is required for a non-blocking switching array;

each primary input of each said input stage subarray is connected individually to a respective redundant input of a respective different one of the other of said sub-arrays of said input stage; and, each primary output of each said output stage sub-array is connected to a respective redundant output of a respective different one of the other of said sub-arrays of said output stage.

2. A switching array as defined in claim 1, wherein;

the number of sub-arrays of said intermediate stage is at least twice the number of said input lines.

3. A three stage switching array as defined in claim 1, wherein said array is a modified Clos type switching array.

4. A three stage switching array as defined in claim 1, wherein;
said primary inputs of said sub-arrays of said input stage and said primary outputs of said sub-arrays of said output stage are connected to said respective redundant inputs and redundant outputs of successive sub-arrays in a cyclic manner.

5. A three stage switching array as defined in claim 1, wherein;
said sub-arrays of said input stage and of said output stage are divided into respective groups; and
said primary inputs and inputs of said sub-arrays of each group are connected to said respective redundant inputs and redundant outputs of the respective sub-arrays of successive groups in a cyclic manner.

6. A three stage switching array as defined in claim 5, wherein;
each said group of sub-arrays is accommodated on a respective circuit board.

7. A three stage switching array according to claim 5, wherein said groups of sub-arrays are constructed of identical modules.

8. A three stage switching array according to claim 1, wherein said sub-arrays are constructed of identical modules.

9. A three stage switching array as defined in claim 1, wherein each of said sub-arrays is a square array having the same respective number of inputs and outputs.

10. A three stage switching array as defined in claim 9, wherein each of said sub-arrays of said input stage and of said output stage have the same number of inputs and outputs.

11. A non-blocking switching array arrangement for a plurality of input lines, comprising:
first and second three stage non-blocking switching arrays each as defined in claim 1;
first means connecting said inputs of said input stage of said first switching array to respective said inputs of said input stage of said second switching array; and
second means for connecting said outputs of said output stage of said first switching array to respective said outputs of said output stage of said second switching array, whereby said first and second switching arrays are connected in parallel.

12. A non-blocking switching array arrangement as defined in claim 11, wherein:
said first means connects each said input of each of said input stage sub-arrays of said first switching array to a respective input of a respective different one of said subarrays of said input stage of said second switching array; and,
said second means connects each said output of each of said output stage sub-arrays of said first switching array to a respective output of a different on of said sub-arrays of said output stage of said second switching array.

* * * * *